(12) United States Patent
Ozeir

(10) Patent No.: US 11,659,792 B2
(45) Date of Patent: May 30, 2023

(54) MAGNETICALLY ATTRACTED PLANT CONTAINERS

(71) Applicant: Ahmad Ozeir, Dearborn, MI (US)

(72) Inventor: Ahmad Ozeir, Dearborn, MI (US)

(*) Notice: Subject to any disclaimer, the term of this patent is extended or adjusted under 35 U.S.C. 154(b) by 0 days.

(21) Appl. No.: 17/402,841

(22) Filed: Aug. 16, 2021

(65) Prior Publication Data

US 2023/0048965 A1 Feb. 16, 2023

(51) Int. Cl.
*A01G 9/02* (2018.01)
*F16M 13/02* (2006.01)

(52) U.S. Cl.
CPC ............ *A01G 9/024* (2013.01); *F16M 13/022* (2013.01)

(58) Field of Classification Search
CPC ......... A01G 9/024; A01G 9/02; F16M 13/022
USPC .............. 248/27.8, 206.5, 683, 309.4; 47/44, 47/41.01
See application file for complete search history.

(56) References Cited

U.S. PATENT DOCUMENTS

| | | | |
|---|---|---|---|
| 4,287,676 A * | 9/1981 | Weinhaus | G09F 7/18 40/661.01 |
| 5,816,548 A * | 10/1998 | Blossom, III | A47G 7/06 248/206.5 |
| 8,001,674 B2 * | 8/2011 | Chen | B23P 19/04 29/709 |
| 8,393,113 B2 | 3/2013 | Rex | |
| 8,479,444 B2 * | 7/2013 | Mesiara | A47G 7/044 248/27.8 |
| 9,894,845 B2 * | 2/2018 | Aller | B65D 25/22 |
| 9,980,439 B2 | 5/2018 | Aller et al. | |
| 10,925,417 B2 * | 2/2021 | Sato | A47G 1/175 |
| 2005/0268548 A1 | 12/2005 | Lovette et al. | |
| 2015/0128491 A1 | 5/2015 | Aller et al. | |
| 2015/0201764 A1 * | 7/2015 | Sato | A47G 1/20 248/205.3 |

FOREIGN PATENT DOCUMENTS

JP H0645564 U * 6/1994

OTHER PUBLICATIONS https://www.westelm.com/products/ceramic-wallscape-planters-d4389/?catalogId=71&sku=5435909&cm_ven=PLA&cm_cat-Google&cm_pla=Garden%20%3E*20Outdoor%20Planters&region_id=477340&cm_ite=5435908&gclid=CjwKCAjwos-HBhB3EiwAe4xM97-3C_ACxek0l08YiklapM4ZqqKnTSAOXV6vy7UgHXtS5RwHrHoCRoCrYcQAvD_BwE.
https://www.amazon.com/Double-Ledge-Suction-Window-Shelf/dp/B011S8N7X4.

* cited by examiner

*Primary Examiner* — Todd M Epps
(74) *Attorney, Agent, or Firm* — Edison Law Group

(57) ABSTRACT

An assembly for attachment to a windowpane is disclosed. The assembly includes an adhesive layer attached to the windowpane, a magnetic material attached to the adhesive layer, and a container comprising a magnetically attracted material.

8 Claims, 7 Drawing Sheets

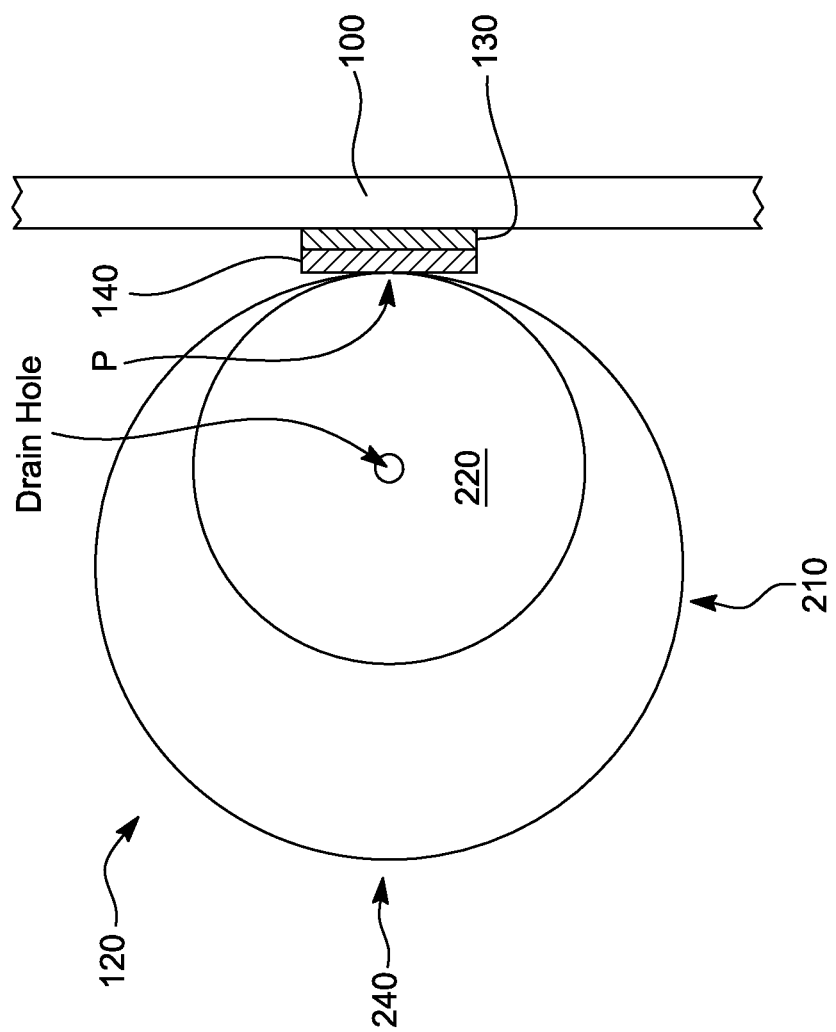

MAGNETICALLY ATTRACTED PLANT CONTAINERS

FIELD

The present invention, in general, is directed to a plant container attachable to a window and, more particularly, is directed to a plant container that is made of a magnetically attracted material, enabling the container to be attached to and removed from a window by a magnet or magnetic material secured to the window.

BACKGROUND

Before disclosing the present subject matter, I wish to not only clarify terms but also introduce certain terms I will be using throughout this patent specification.

A "magnet" (such as loadstone, a strongly magnetic variety of the mineral magnetite) or a "magnetic material" (in particular, the rare earth neodymium) is a material having the property of being capable of attracting iron and certain steels.

A "magnetically attracted material," to which I shall refer by the acronym ["MAM"], shall be understood to mean a material—such as iron, certain steels, and certain stainless steels—that is attracted to a magnet or a magnetic material.

Most plant enthusiasts know which of their potted plants (which includes succulents) require maximum sunshine for a region of the country where the plant enthusiast resides. Certain plant enthusiasts, to maximize sunshine received, will move their potted plants, relative to a source of sunshine, as the seasons change.

Most potted plant enthusiasts would like to be able to attach a potted plant, such as a potted succulent, directly to a windowpane for maximum sunshine, and also would like to be able to move it along a window surface as the seasons change.

Investigating prior art, I found U.S. Pat. No. 8,393,113 (to Rex) for a suction cup surface mounted shelf and planter assembly; U.S. Pat. No. 9,980,439 (to Aller et al.) for a modular magnetic container system; US published application 2005/0268548 (to Lovette et al.) for a hanging device and method; and US published application 2015/0128491 (to Aller et al.) for a mountable modular magnetic container system.

Prior art US patents and published US applications that I reviewed did not solve—individually or collectively—problems solved by the present subject matter.

SUMMARY

The present subject matter is directed to an assembly for attaching a potted plant such as a succulent to a windowpane. The assembly includes an adhesive layer attached to the windowpane, a magnetic material attached to the adhesive layer, and a container that is manufactured from a magnetically attracted material. The container is configured to contain a potted plant. The adhesive layer and magnetic material together have sufficient strength to securely attach the container to windowpanes when the container contains a plant such as a succulent.

BRIEF DESCRIPTION OF THE DRAWINGS

FIG. 3, FIG. 3A are view of the pot of FIG. 2, looking down from the plane 3-3.

Throughout the drawing figures and detailed description, I shall use similar reference numerals to refer to similar components of my window-mount assembly.

DETAILED DESCRIPTION

Figure 1:
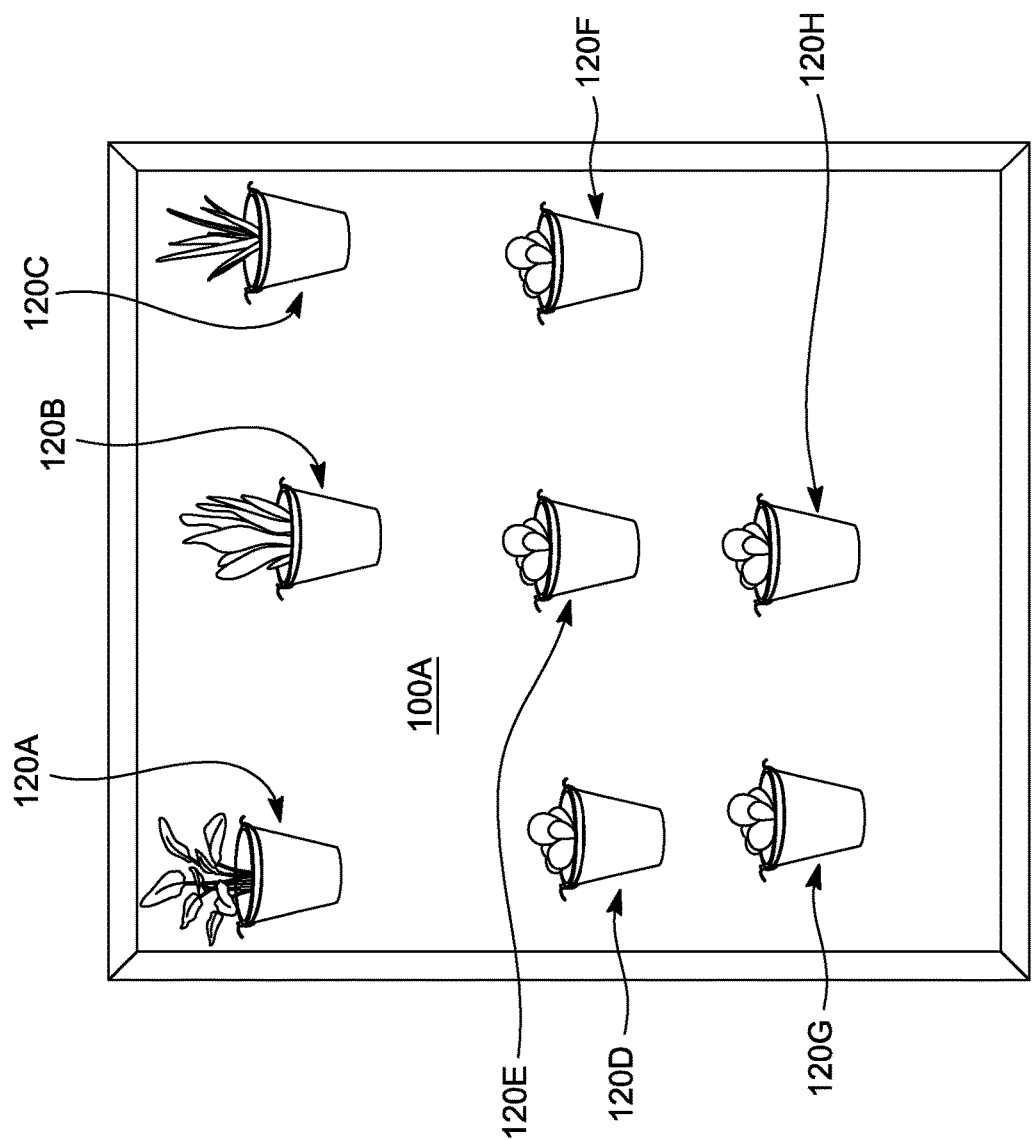
FIG. 1 shows potted succulents independently attached to a windowpane.

For those potted plant enthusiasts who believe a single picture is capable of providing volumes of information, please refer to my FIG. 1 which demonstrates that a single windowpane 100 can have attached to it a plurality of potted plant containers 120A, 120B, 120C, 120D, 120E, 120F, 120G, and 120H. Please also note that each of the potted plants shown attached to windowpane 100A is a succulent.

Figure 2:
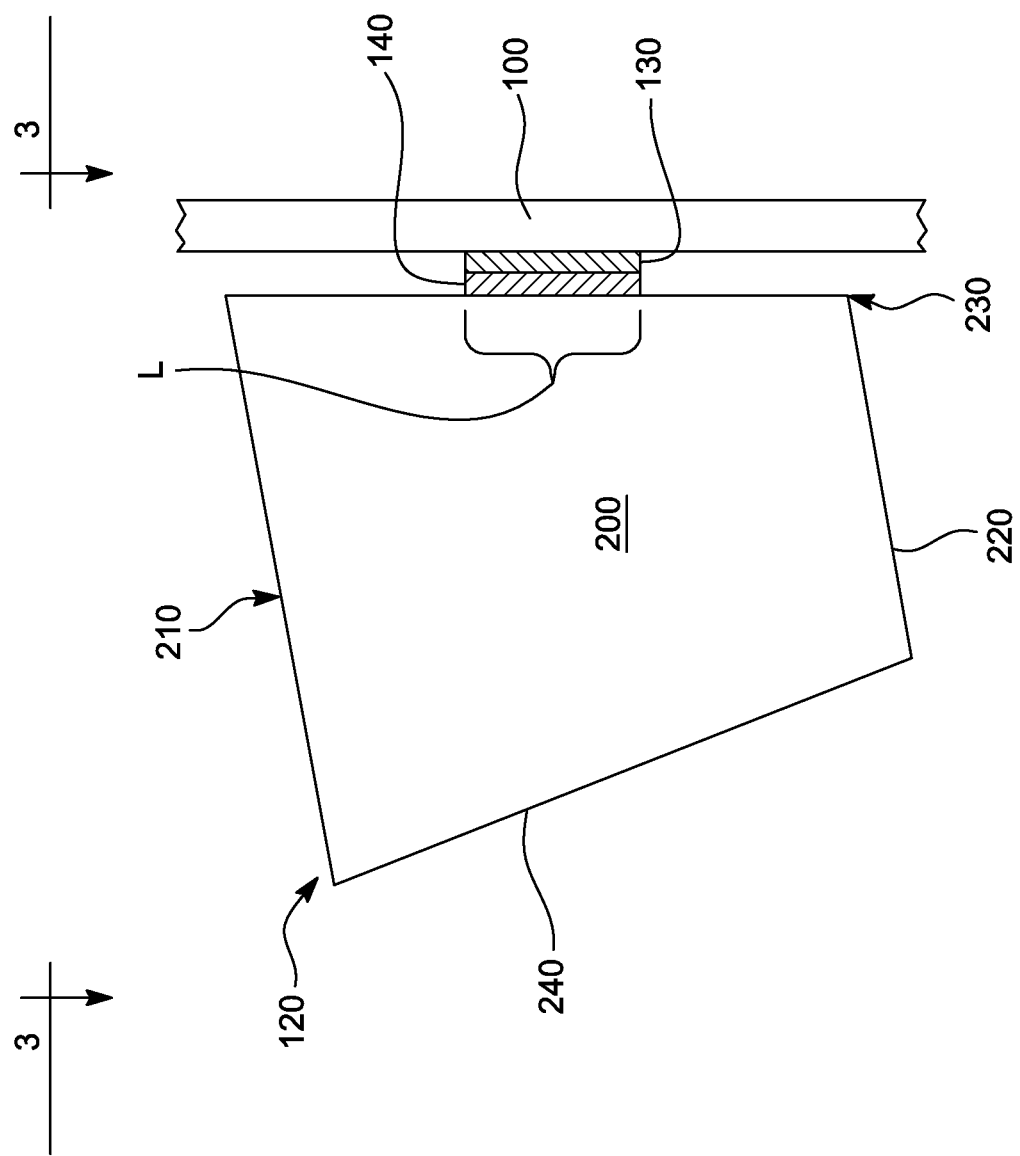
FIG. 2 presents a side elevational view of a pot attached to a windowpane.
Figure 3:
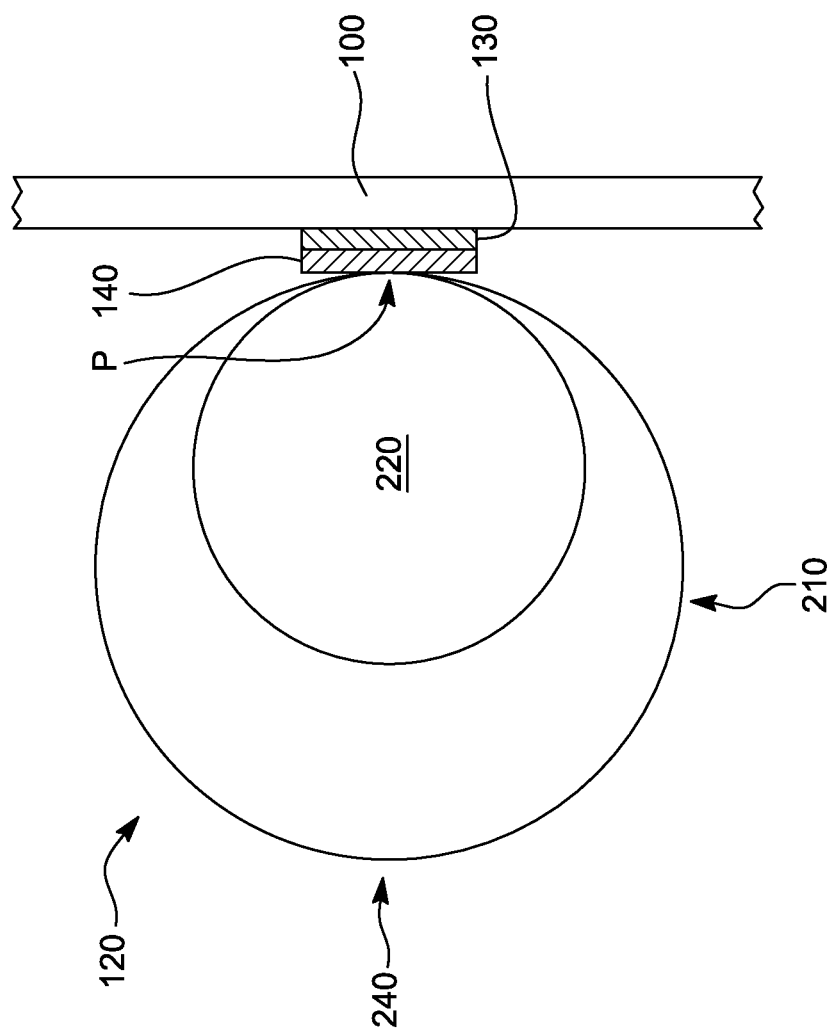

FIGS. 2 and 3 disclose details for attaching a potted plant container 120 to a windowpane 100. Components of an assembly for attaching the potted plant container 120 to windowpane 100 include an adhesive layer 130 attached to the windowpane 100 and a magnetic material 140 attached to the adhesive layer 130.

The adhesive layer 130 is formulated from commercially available materials having properties that enable the adhesive layer 130 to remain securely attached to windowpane 100 until a person wants to remove the adhesive layer 130 from the windowpane 100. Commercial examples of adhesive materials suitable for formulating adhesive layer 130 of the present subject matter include wood glues, elastomers, silicone sealants, pressure sensitive tapes, and pressure sensitive films. Further, as those of ordinary skill in the field of adhesives and adhesive materials know, some of these commercially available adhesive materials are detachable from a substrate such as windowpane 100 and also re-attachable to the substrate.

The container 120 comprises a magnetically attracted material such as iron, magnetic steel, and/or magnetic stainless steel. Examples of suitable commercially available magnetic stainless steels include but are not limited to ferritic stainless steels such as grades 409, 430, 439; martensitic stainless steels such as grades 410, 420, 440; and duplex stainless steel such as grade 2205. Also, the adhesive layer 130 has sufficient adhesive strength while the magnetic material 140 has sufficient magnetic strength, so that the container 120 is securely retained by the adhesive layer 130 to the windowpane 100 when the container 120 contains a potted plant.

A number of physical properties are used to describe the magnetic materials of the present subject matter. Remanence (Br) measures the strength of the magnetic field. Coercivity (Hci) measures the resistance of the magnetic material to becoming demagnetized. Maximum energy product (BH max) measures the density of the magnetic field, characterized by the maximum value of magnetic flux density (B) multiplied by the magnetic field strength (H). And Curie Temperature (Tc) measures the temperature at which the magnetic material loses its magnetism.

The following Table presents physical properties of commercially available magnetic materials which are suitable for purposes of the present subject matter.

TABLE

| Magnetic Material | Br | Hci | BHmax | Tc °C. | Tc °F. |
|---|---|---|---|---|---|
| Nd2Fe14B, sintered | 1.0-1.4 | 750-2,000 | 200-440 | 310-400 | 590-752 |
| Nd2Fe14B, bonded | 0.6-0.7 | 600-1,200 | 60-100 | 310-400 | 590-752 |
| SmCo5, sintered | 0.8-1.1 | 600-2,000 | 120-200 | 720 | 1,328 |
| Sm (Co, Fe, Cu, Zr)7, sintered | 0.9-1.15 | 450-1,300 | 150-240 | 800 | 1,472 |
| AlNiCo, sintered | 0.6-1.4 | 275 | 10-88 | 700-860 | 1,292-1,580 |
| Sr-ferrite, sintered | 0.2-0.78 | 100-300 | 10-40 | 450 | 842 |

Notes:
Remanence (Br) is measured in units of Tesla (kiloGrams per second-squared per ampere).
Coercivity (Hei) is measured in units of kA/m (kiloAmperes per meter).
And Maximum Energy Product (BHmax) is measured in units of kJ/m3 (kiloJoules per meter-cubed).

Detailed Description (Continued)

N48, N50, and N52 are magnetic-strength grades of rare earth neodymium magnets that are suitable for purposes of the present subject matter. A neodymium magnet (also known as NdFeB or NIB) is made, via a known sintering process and/or by a known bonded process, from an alloy of neodymium, iron, and boron to form a tetragonal crystalline structure characterized by the chemical formula Nd2Fe14B.

The windowpane 100 shown in FIGS. 2 and 3 is planar. Yet, the adhesive materials used to make adhesive layer 130 of the present subject matter also have sufficient adhesive strength to securely attach to windowpanes that are not planar.

The shape of the container 120 shown in FIGS. 2, 3 is known as frustoconical, a word formed from the word "frustrum," a solid figure formed when the top of a solid having a planar base is cut off by a second plane parallel to its base, and the word "cone," a solid having a circle for its base and also having a curved exterior surface that tapers evenly to an apex so that any point on its surface is on a straight line. The term "frustoconical" thus describes a cone with its apex portion removed.

Container 120 shown in FIGS. 2, 3 has an exterior surface 200, an opening 210, a bottom 220, and an edge portion 230 to which magnetic material 140 is attached. Magnetic material 140 shown in FIGS. 2, 3 is disc shaped. Thus, the container 120 is attached to magnetic material 140 along a line "L" defined by edge portion 230, shown in FIG. 2. The line "L" becomes a point "P" when viewed from above, as shown in FIG. 3. The magnetic materials of the present subject matter are quite strong magnetically. Yet, the "line-contact" feature of the present subject matter facilitates minimal effort when removing potted plants from a windowpane.

FIGS. 2 and 3 depict another edge portion 240 of container 120, which is located opposite the edge portion 230 that provides the line-contact feature noted.

Figure 4:
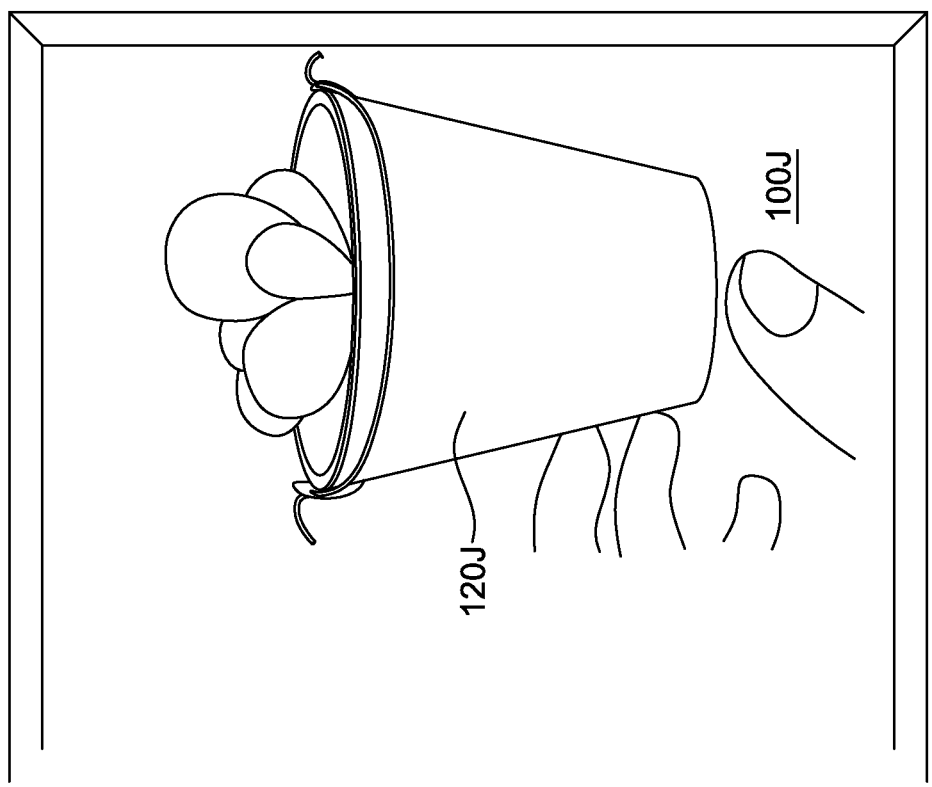
FIG. 4, FIG. 5, and FIG. 6 are sequential views of a person removing a pot from a window.
Figure 5:
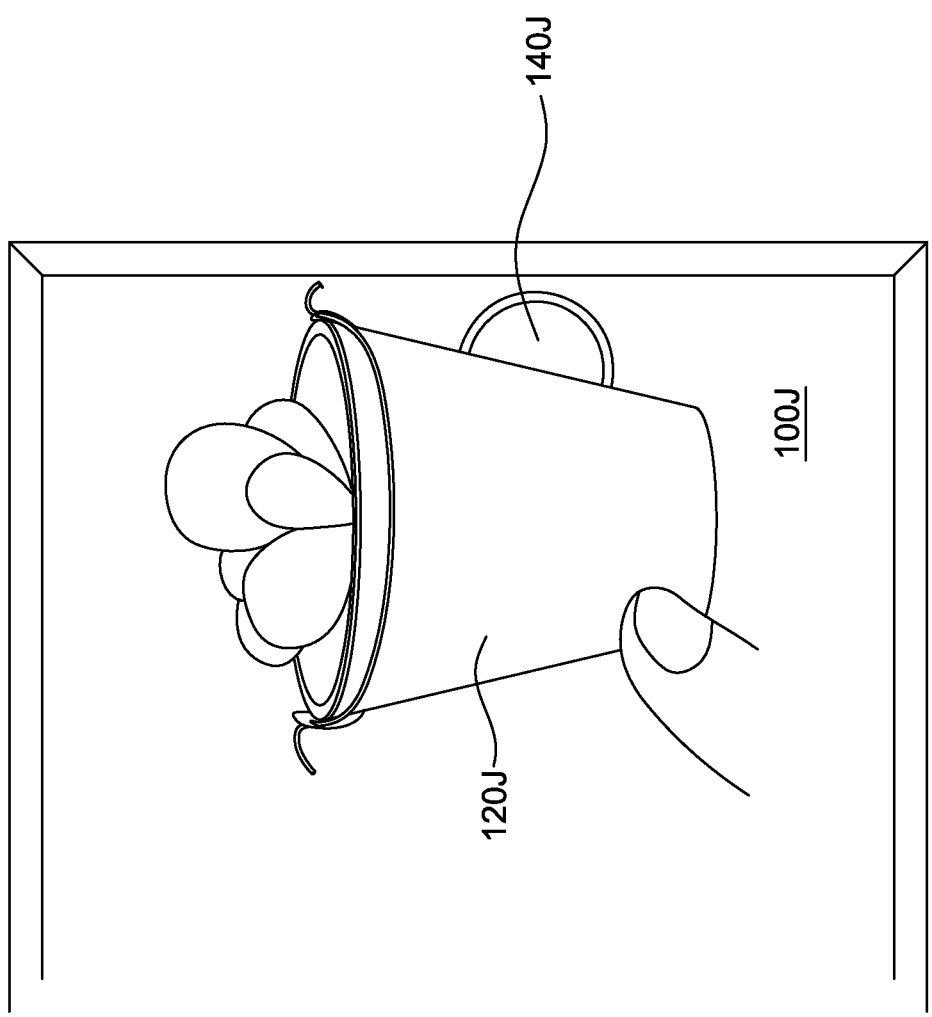
Figure 6:
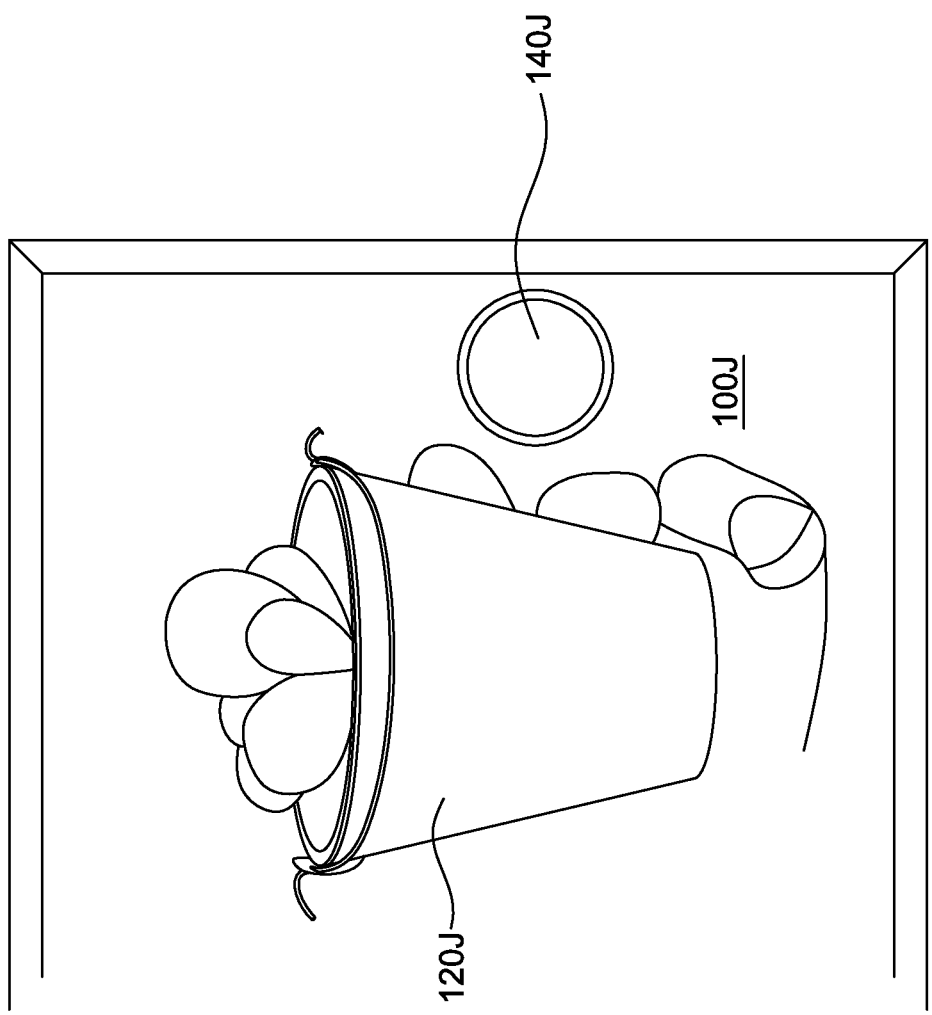

FIGS. 4-6 illustrate ease-of-removal of a potted plant from a windowpane as a result of the line-contact feature of the present subject matter. FIG. 4 shows a person reaching for a potted plant in a container 120J secured to windowpane 100J. FIG. 5 next shows the person removing the container 120J from a disc magnet 140J. FIG. 6 shows the person holding container 120J now separated from magnet 140J.

What has been illustrated and described is an assembly for attachment to a windowpane, in which the assembly includes an adhesive layer attached to the windowpane and a magnetic material attached to the adhesive layer. While the present subject matter has been illustrated and described with reference to certain exemplary embodiments, the present subject matter is not to be limited to these embodiments. Quite the contrary, many alternatives, changes and modifications will become apparent to those of ordinary skill in the field of the present subject matter upon reading my present patent specification. For instance, a container for plants, according to the present subject matter, can have a closed bottom as shown in FIG. 3 or could include a drain hole as shown in FIG. 3A. As a result, all alternatives, changes and/or modifications are to be treated as forming part of the present subject matter insofar as they fall within the spirit and scope of claims that follow.

I claim:

1. An assembly for attachment to a windowpane, comprising:
    an adhesive layer attached to the windowpane;
    a magnetic material attached to the adhesive layer; and
    a container made of a magnetically attracted material and magnetically secured to the magnetic material,
    wherein the magnetic material has a magnetic strength effective for magnetically securing the container thereto,
    wherein the adhesive layer has an adhesive strength effective for securing the magnetic material thereto, and
    wherein the adhesive strength of the adhesive layer is effective for retaining the container to the windowpane when the container contains a potted plant.

2. The assembly of claim 1, wherein the adhesive layer is an adhesive material selected from the group consisting of a wood glue, an elastomer, a silicone sealant, a pressure sensitive tape, and a pressure sensitive film.

3. The assembly of claim 1, wherein the windowpane is planar.

4. The assembly of claim 1, wherein the magnetic material is a rare earth neodymium magnet.

5. The assembly of claim 1, wherein the container is made of a magnetically attracted material selected from the group consisting of iron, magnetic steel, and magnetic stainless steel.

6. The assembly of claim 1, wherein the container is made of a magnetic steel or a magnetic stainless steel.

7. The assembly of claim 1, wherein the container is made of a magnetic stainless steel.

8. The assembly of claim 1, wherein the container is of frustoconical shape.

\* \* \* \* \*